(12) United States Patent
Plogmann

(10) Patent No.: US 10,345,182 B2
(45) Date of Patent: Jul. 9, 2019

(54) SENSOR ELEMENT FOR RECORDING AT LEAST ONE PROPERTY OF A FLUID MEDIUM

(71) Applicant: Robert Bosch GmbH, Stuttgart (DE)

(72) Inventor: Benjamin Plogmann, Rosswaelden (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/926,026

(22) Filed: Mar. 20, 2018

(65) Prior Publication Data

US 2018/0292283 A1 Oct. 11, 2018

(30) Foreign Application Priority Data

Apr. 5, 2017 (DE) .................. 10 2017 205 837

(51) Int. Cl.
*G01L 19/14* (2006.01)
*G01M 15/09* (2006.01)
*G01L 9/00* (2006.01)

(52) U.S. Cl.
CPC .......... *G01L 19/147* (2013.01); *G01L 9/0041* (2013.01); *G01M 15/09* (2013.01)

(58) Field of Classification Search
CPC ..... G01L 19/147; G01L 9/0041; G01M 15/09

USPC ........................................................... 73/756
See application file for complete search history.

(56) References Cited

U.S. PATENT DOCUMENTS

| 2009/0071260 A1* | 3/2009 | Speldrich .............. G01L 19/146 73/756 |
| 2010/0089169 A1* | 4/2010 | Koehler ................ G01L 19/143 73/756 |
| 2011/0036176 A1* | 2/2011 | Bradley ................ G01L 19/147 73/756 |

FOREIGN PATENT DOCUMENTS

| DE | 102007053273 A1 * | 2/2009 | .............. G01F 1/46 |
| DE | 102007053273 A1   | 2/2009 | |
| DE | 102014212854 A1   | 1/2016 | |

* cited by examiner

*Primary Examiner* — Jamel E Williams
(74) *Attorney, Agent, or Firm* — Norton Rose Fulbright US LLP; Gerard Messina

(57) ABSTRACT

A sensor element for recording at least one property of a fluid medium. The sensor element includes at least one housing that forms at least one wall of at least one flow channel that can be traversed by the flow of the fluid medium. In the wall, at least one pressure tap branches off from the flow channel. At least one pressure sensor for recording a pressure of the fluid medium is configured in the pressure tap. Provided in the wall is at least one outflow contour that at least partially surrounds an orifice of the pressure tap and is adapted for diverting impurities flowing along the wall away from the orifice of the pressure tap.

10 Claims, 3 Drawing Sheets

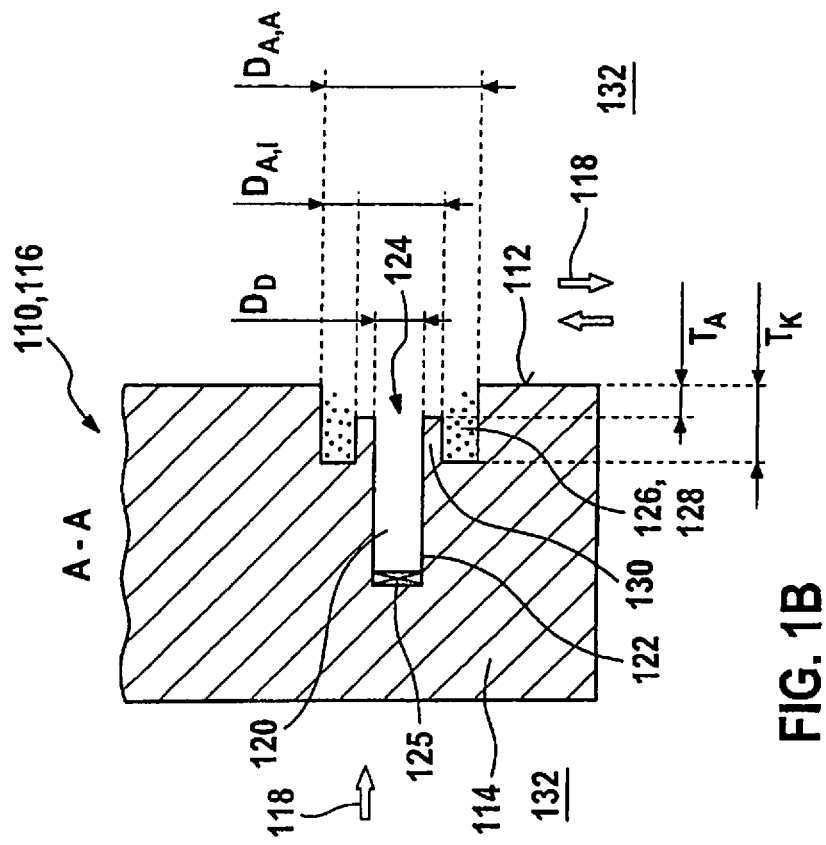
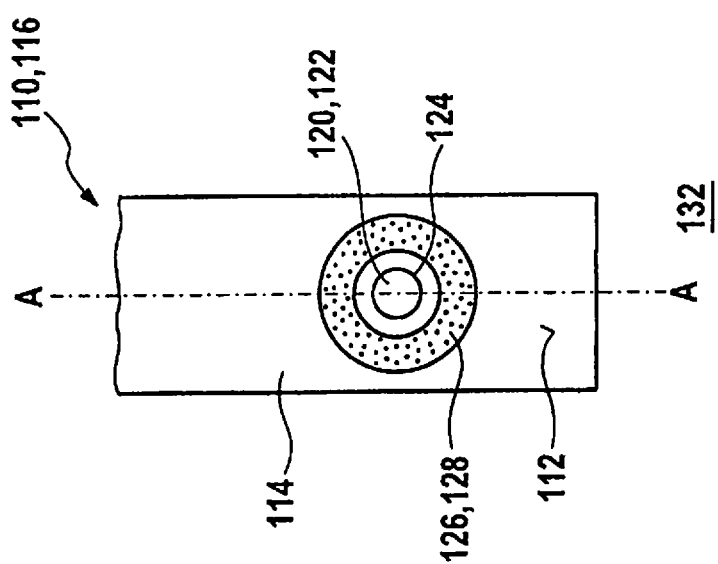
FIG. 1B
FIG. 1A

SENSOR ELEMENT FOR RECORDING AT LEAST ONE PROPERTY OF A FLUID MEDIUM

CROSS REFERENCE

The present application claims the benefit under 35 U.S.C. § 119 of German Patent Application No. DE 102017205837.4 filed on Apr. 5, 2017, which is expressly incorporated herein by reference in its entirety.

BACKGROUND INFORMATION

Different types of sensor elements for recording at least one property of a fluid medium are available in the related art. The present invention is described in the following with reference to pressure-based mass airflow meters. However, other embodiments are also possible.

To determine the air mass in air systems, such as in the induction tract of an internal combustion engine, for example, various measurement principles are generally used. Besides the thermal measuring principles, at the basis of hot-film air mass meters (HFM), for example, air-mass measurements may be based on at least one pressure measurement. Mention is made here exemplarily of what are generally referred to as Prandtl probes or venturi tubes. To determine an air mass that flows through a tube per unit of time, for example, a differential pressure is measured from two static pressures or one static pressure and an absolute pressure. It is possible in these methods to enhance the accuracy of the air mass measurement, for example, by determining the density on the basis of additional pressure and/or temperature measurements.

German Patent Application No. DE 10 2014 212 854 A1, for example, describes a flowmeter for measuring a flow rate of a fluid medium that flows through a flow tube in a main flow direction. The flowmeter includes a disturbing element that partially narrows a flow cross section of the flow tube, a first pressure measuring point that is configured upstream of the disturbing element relative to the main flow direction, and a second pressure measuring point that is configured downstream of the disturbing element relative to the main flow direction. The disturbing element is designed for variably narrowing the flow cross-section of the flow tube.

German Patent Application No. DE 10 2007 053 273 A1 describes a flowmeter for measuring a flow rate of a fluid medium that flows through a flow tube in a main flow direction. The flowmeter features a connector part that has an incident flow side and an outflow side. Configured in the connector part on the inflow side is a stagnation chamber that is accessible on the inflow side through an opening. A first pressure measuring point is accommodated in a side wall of the stagnation chamber. A second pressure measuring point is configured in an outer wall of the connector part.

In spite of the advantages achieved using conventional measuring devices, there are still a multitude of technical challenges to overcome in the measurement of flow properties of fluid media. One challenge specifically encountered in the induction tract of internal combustion engines is to protect the sensors used from water and dirt particles and to thereby prevent the pressure sensors from providing an incorrect indication and, associated therewith, a faulty indication of the air mass.

SUMMARY

Accordingly, a sensor element is provided for recording at least one property of a fluid medium. As is described in greater detail below, the sensor element may be a mass airflow meter, for example, a flowmeter, a flow measuring device, an absolute pressure gauge or a differential-pressure gauge. The present invention may be employed in one or more of the flowmeters named above. Other embodiments are also possible, however.

Specifically, the at least one property of the fluid medium may be a flow property, for example, a velocity, a volumetric flow, a mass flow, a pressure, a pressure differential or another physically measurable property. In principle, however, other properties are also possible. The sensor element may be designed, namely, for recording an absolute pressure and/or a differential pressure of the fluid medium.

Specifically, the sensor element may be completely or partially configured as a plug-in sensor. The sensor element then includes a housing that may form or include a plug-in sensor, for example, be inserted into a flow tube of the fluid medium, for example, in an induction tract of an internal combustion engine, or may project into the same. In principle, other embodiments are also possible, however.

Generally, the fluid medium may be any gas or liquid. The fluid medium may, in fact, be an induction air mass of an internal combustion engine or also an exhaust gas thereof. Accordingly, the sensor element may especially be used in the automotive engineering sector. In principle, however, other fields of application are also possible.

As explained above, the example sensor element includes at least one housing. The housing forms at least one wall or one or more flow channels that may be traversed by the flow of the fluid medium. The at least one flow channel may be configured as a closed flow tube, for example. Alternatively, however, the flow channel may also be simply defined by the housing wall that the fluid medium flows over, or the wall is oriented and configured to allow the fluid medium to flow over the same. The housing may be fabricated of a plastic, for example, a ceramic material or also of a metallic material. Specifically, the flow channel may be traversed by the flow in one direction of flow. In the context of the present invention, a flow direction is thereby generally understood to be a mass transport direction or the average fluid-medium mass transport at the sensor element location or, especially, at the pressure tap location. For example, the flow direction may be a direction parallel to an axis of a flow tube or flow tube section through which the fluid medium flows.

In the housing wall, at least one pressure tap branches off from the flow channel. In this context, a pressure tap is generally understood to be a channel that extends parallel or transversely to the flow in the flow channel into which a portion of the fluid medium flowing through the flow channel may be diverted. More specifically, the pressure tap may be configured as a blind channel, for example, as a blind hole.

At least one pressure sensor for recording a pressure of the fluid medium is configured in the pressure tap. Specifically, the pressure sensor may be at least one micromechanical pressure sensor, for example, at least one micromechanical pressure sensor element, for example, a semiconductor sensor. Such sensors are typically based on the deformation of a membrane of the pressure sensor element in response to an absolute pressure or a differential pressure, piezoelectric sensors and/or resistors being able to measure the deformation of the membrane. Additionally or alternatively, however, other pressure sensors may be used.

Furthermore, provided in the wall is at least one outflow contour that at least partially surrounds an orifice of the pressure tap and that is adapted for diverting impurities that flow along the wall away from the orifice of the pressure tap.

An outflow contour is thereby generally understood to be a surface contour in a surface that is adapted for directing or diverting a fluid flowing along the surface in one or more predefined directions. More specifically, the outflow contour may have at least one element selected from the group that includes: a groove, a channel, an edge, and a bulge. In principle, other embodiments are also possible, however.

An orifice is thereby generally understood to be an opening that forms in a first channel when a second channel branches off therefrom. In the present case, the orifice is formed at the location where the pressure tap in the wall branches off from the flow channel.

The outflow contour surrounds the orifice of the pressure tap at least partially, preferably completely. The outflow contour may form an arch on the incoming flow side of the orifice, for example. Alternatively, however, the outflow contour may also completely surround the orifice, for example, in a circular form. In principle, other embodiments are also possible, however.

Specifically, the outflow contour may include an annular groove. Also possible are a combination of a plurality of annular grooves, likewise a combination of other types of outflow contours, and/or a combination of at least one annular groove and at least one other type of outflow contour. An annular groove is generally understood to be a closed depression, which forms a ring when considered in a plan view, it being possible for the ring to have a circular, oval, or also polygonal form, for example. In a sectional plane orthogonally to the wall, the depression may basically have any cross section, for example, a triangular, a rounded or also a rectangular cross section. Notably, a rectangular cross section may be used. A combination of a rectangular cross section that includes a circular form of the depression may also be referred to as a circular-cylindrical form of the annular groove.

The annular groove may especially have a depth of at least 2 mm. The annular groove may have a depth of at least 3 mm, for example. At least one partition wall may be provided between the outflow contour and the pressure tap. The partition wall may, in fact, be recessed from the wall. Therefore, water and dirt particles, which approach the orifice of the pressure tap, may initially impinge on the outflow contour that has a depth $T_K$, for example. This may subsequently be adjoined by the partition wall that, for example, may be recessed from the level of the wall, as before, by a depth of $T_A$, where $T_A < T_K$. The pressure tap may then adjoin the wall.

The outflow contour is preferably at least 2-3 mm deeper than the partition wall, thus $T_K \geq T_A + 2\text{-}3$ mm or $T_K > T_A + 2\text{-}3$ mm.

As explained above, the sensor element may especially be completely or partially configured as a plug-in sensor. A longitudinal extension axis of the plug-in sensor may, in fact, be oriented substantially orthogonally to the flow direction.

The at least one pressure tap may especially have at least one position that is selected from the group that includes: a position in a side wall of the plug-in sensor; a position in a rear side of the plug-in sensor facing away from the flow direction; a position in an end face of the plug-in sensor extending the furthest into the fluid medium. Furthermore, the sensor element may have at least one flow tube section; the plug-in sensor being introduced into the flow tube section. The plug-in sensor may be introduced through at least one opening in a wall of the flow tube section. The plug-in sensor may be permanently or also replaceably introduced into the flow tube section.

Specifically, the sensor element may be selected from the group that includes: a mass airflow meter, a flowmeter, a flow measuring device, an absolute pressure gauge and a differential-pressure gauge.

As described above, the pressure tap may especially be completely or partially configured as a bore, namely as a cylindrical bore. Thus, the pressure tap may feature a bore that branches off from the flow channel. The bore may be completely or partially configured as a cylindrical bore. More specifically, the pressure tap may be configured as a blind bore that branches off from the flow channel; the pressure sensor being configured at one end of the blind bore. For example, the pressure tap may be completely or partially configured as a cylindrical bore, one end of the cylindrical bore being open toward the flow channel, while the other end being completely or partially closed by the pressure sensor.

The example sensor element according to the present invention has numerous advantages over conventional sensor elements. The pressure tap may, in fact, be a static pressure tap. The at least one outflow contour may at least substantially prevent water and dirt particles from reaching the pressure tap. Thus, for example, only air that is dry and free of dirt particles may arrive at the differential-pressure sensor. Altogether, therefore, it is possible to prevent the pressure sensors from providing a temporary false indication due to water accumulation and dirt deposits. Furthermore, it is possible to prevent a permanent change in the characteristic of the pressure sensors and thus a faulty determination of the air mass due to dirt deposits.

The sensor element according to the present invention may, in fact, be advantageously used in pressure-based mass airflow meters (PFMs), especially in an air system downstream of a charge-air cooler and upstream of a throttle valve. Entrained by the flow, water and dirt particles usually arrive at the static pressure taps in such systems. However, the design of the example sensor element having the at least one outflow contour that is integrated in the housing, makes it possible for the at least one pressure sensor to be effectively protected from water accumulations and dirt deposits.

BRIEF DESCRIPTION OF THE DRAWINGS

Further details and optional features of the present invention are described in the exemplary embodiments that are schematically shown in the figures.

FIGS. 1A and 1B show an exemplary embodiment of a sensor element according to the present invention.

DETAILED DESCRIPTION OF EXAMPLE EMBODIMENTS

Figure 2A:
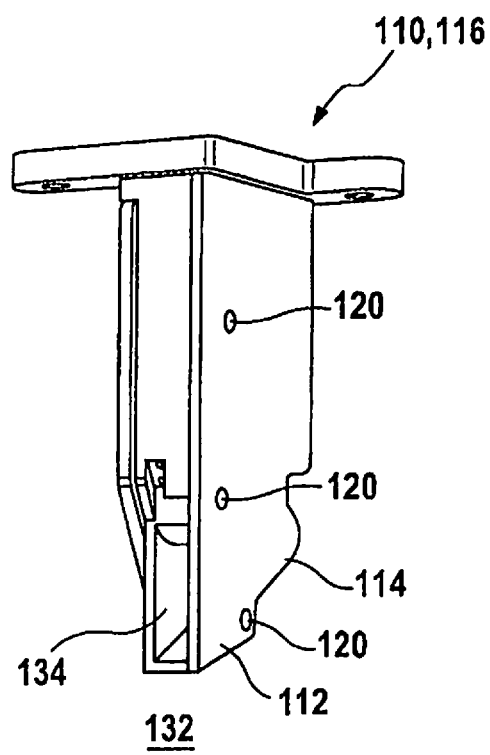
FIGS. 2A and 2B show various representations of a sensor element according to the present invention in the form of a plug-in sensor.

FIGS. 1A and 1B show an exemplary embodiment of a sensor element 110 according to the present invention. In this instance, FIG. 1A shows a plan view of a wall 112 of a housing 114 of sensor element 110, and FIG. 1B shows a sectional view through housing 114 along a line of intersection A-A in FIG. 1.

In this exemplary embodiment, the sensor element is in the form of a plug-in sensor 116 that may be designed, for example, as a pressure-based mass airflow meter (PFM). Sensor element 110 extends into a flow of a fluid medium and may be circumflowed by the fluid medium, for example, in one or more possible flow direction(s) 118 shown in FIG. 1B. Accordingly, wall 112 may, for example, be at least one side wall, at least one front wall, at least one rear wall, or also at least one front end face of plug-in sensor 116.

Sensor element 110 has at least one pressure tap 120. If a plurality of pressure taps 120 are provided, then a differential pressure may be generated, for example, as is clarified in greater detail in the following with reference to FIGS. 2A and 2B. Pressure tap 120 includes at least one bore 122, for example, at least one cylindrical bore 122, for example, which is sunk into wall 112 at an orifice 124. Bore 122 is designed, in fact, as a blind bore. Configured at the end of bore 122 in pressure tap 120 is a pressure sensor 125 for recording a pressure of the fluid medium. Pressure tap 120 may be used, namely, for recording a static pressure of the fluid medium.

Furthermore, at least one outflow contour 126 is provided in wall 112. This outflow contour 126 surrounds orifice 124 of pressure tap 120 at least partially; and more specifically, as shown in FIGS. 1A and 1B, completely. Outflow contour 126 is adapted for diverting impurities flowing along wall 112 away from orifice 124 of pressure tap 120.

In the illustrated exemplary embodiment, outflow contour 126 annularly surrounds orifice 124 of pressure tap 120. As is discernible in FIG. 1B, outflow contour 126 may include an annular groove 128 that has a circular-cylindrical or a cylindrical ring design and features a rectangular profile, for example. In principle, however, other profiles are also possible.

Outflow contour 126 has a depth $T_K$. Provided, moreover, between outflow contour 126 and bore 122 of pressure tap 120 is a partition wall 130 that may also be referred to as a shoulder. This partition wall 130 may, in fact, be recessed from wall 112, especially set back by a depth TA from wall 112. Pressure tap 120 itself may have a diameter $D_A$. An inner diameter of annular groove 128 is denoted in FIG. 1B by $D_{A,I}$. An outer diameter of outflow contour 126 is denoted in FIG. 1A by $D_{A,A}$.

The purpose of outflow contour 126 is to protect pressure sensor 125 from an ingress of water accumulations and dirt deposits. If a plurality of pressure taps 120 are provided in sensor element 110, then at least one of pressure taps 120, a plurality of pressure taps 120, or even all of pressure taps 120 may be provided with an outflow contour of this kind. Specifically, static pressure taps may have such an outflow contour 126. Water and dirt particles, that advance over wall 112 toward pressure tap 120, are deflected by outflow contour 126 and flow past static pressure tap 120 in outflow contour 126. Thus, the static pressure taps are protected from water and dirt particles.

A plurality of measures make it possible to augment the deposition of water and dirt particles in the configuration in accordance with FIGS. 1A and 1B, as well as in other embodiments. Thus, on the one hand, shoulder depth $T_A$ may be increased, preferably under the condition that outflow contour depth $T_K$ is at least two to three times greater than shoulder depth $T_A$. Water droplets that flow away over outflow contour 126 generally do not come in contact with the surface defined by diameters $D_D$ and $D_{A,I}$. Furthermore, alternatively or additionally to the measures mentioned, outflow contour depth $T_K$ may be increased. Furthermore, the cross section of the outflow contour may be increased. On the other hand, the surface area defined by diameters $D_D$ and $D_{A,I}$ may also be minimized, alternatively or additionally to one or more of the measures already mentioned. For example, shoulder depth $T_A$ may be 2-10 mm; outflow contour depth $T_K$ may, in fact, have a value of $T_K=T_A+3$ to 6 mm. Diameter $D_D$ may, for example, be 4-6 mm. Diameter $D_{A,I}$ may, for example, have a value of $D_{A,I}=D_D+2$ to 5 mm. Diameter $D_{A,A}$ may have a value of $D_{A,A}=D_{A,I}+4$ to 10 mm, for example.

Figure 2B:
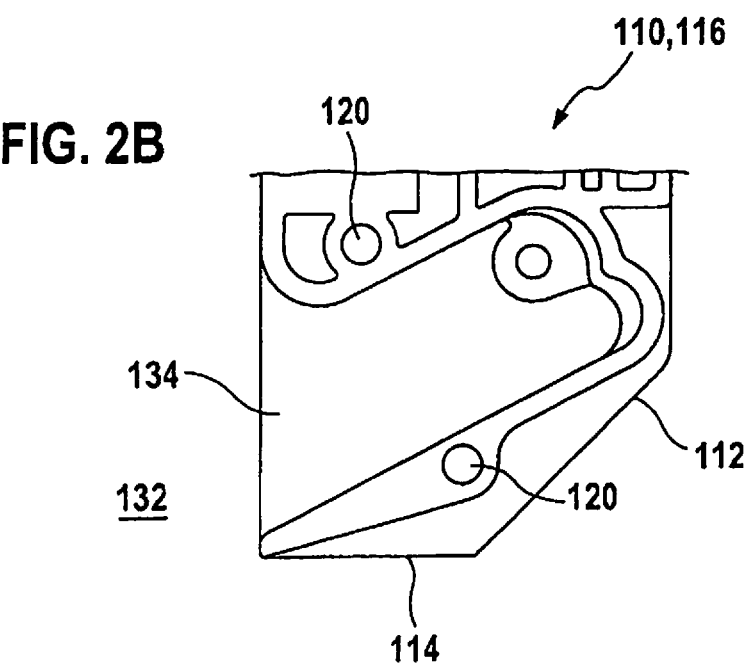

With reference to FIGS. 2A and 2B, the following explains how housing 114 and pressure tap 120 may be designed. Thus, the figures show various representations of a sensor element 110 according to the present invention, which, in turn, may be in the form of a plug-in sensor 116. Plug-in sensor 116 may extend into a flow channel 132, for example, so that at least one wall 112 of flow channel 132 is formed at least partially by housing 114. In this context, FIG. 2A shows an embodiment of plug-in sensor 110 with a closed cover, whereas a cover is removed in the embodiment in accordance with FIG. 2B, so that a channel section 134, which is configured in housing 114 and into which fluid medium may enter through an opening 128, is visible. Apart from outflow contour 126, reference may be made to the German Patent Application No. DE 10 2007 053 273 A1 described above for possible embodiments of sensor element 110. Other embodiments are also possible, however.

As is discernible in these FIGS. 2A and 2B, sensor element 110 may have a plurality of pressure taps 120 that may be configured within channel section 134 and/or on an outer side and/or front end and/or rear side and/or front side of plug-in sensor 116. Thus, every region of housing 114 that is attainable by the fluid medium and over which the fluid medium is able to flow, may function as wall 112 that features at least one pressure tap 120. For example, in the illustrated example, two pressure taps 120 may be configured on an outer side of housing 114, thus on an outer side of plug-in sensor 116, and a pressure tap 120 on the inside of channel section 134. Of these pressure taps 120, one, a plurality of, or all pressure taps 120 may be designed to include the described outflow contour 126. Various other configurations are possible.

Figure 3:
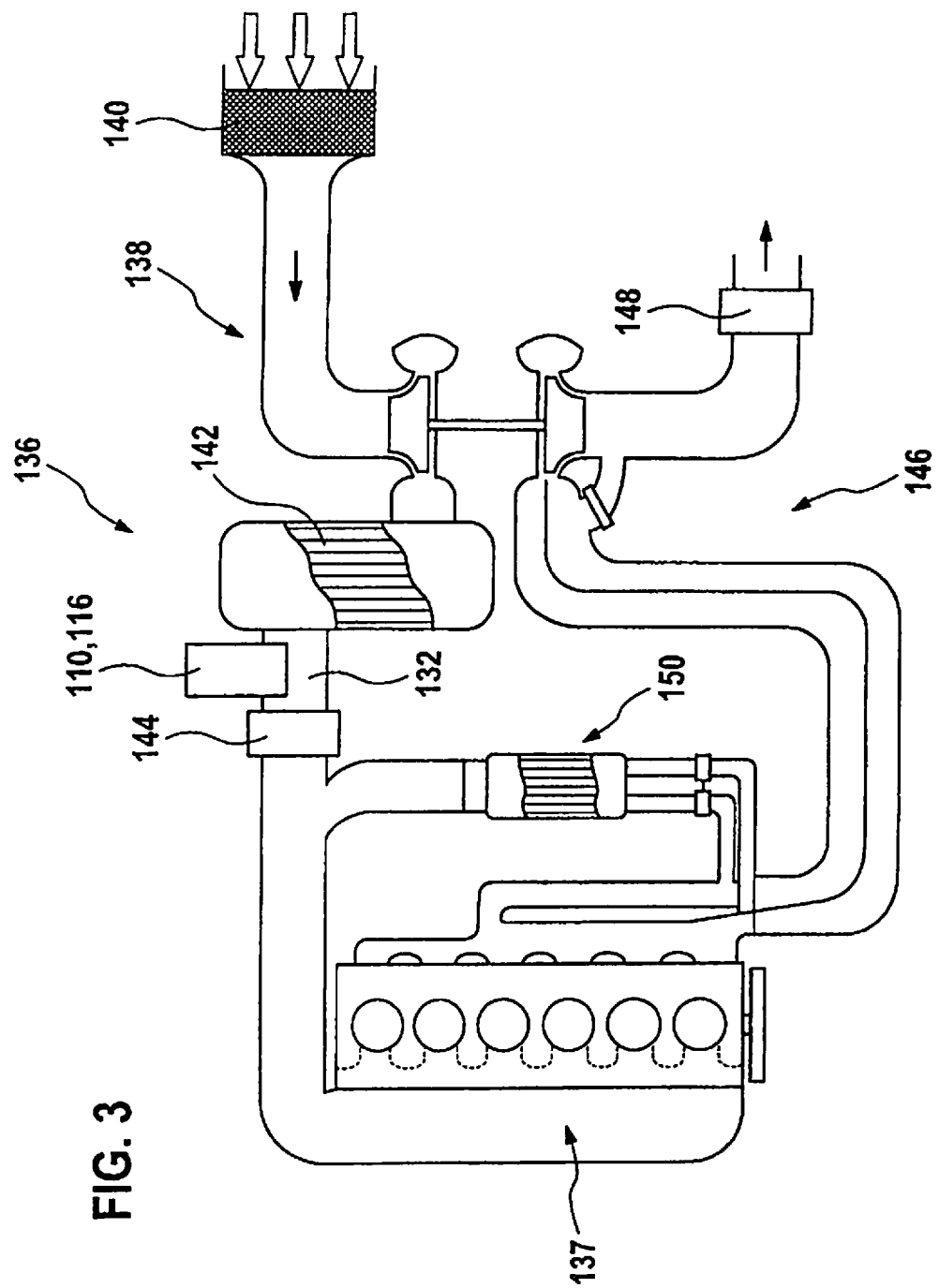
FIG. 3 shows an air system of an internal combustion engine having a configuration of the sensor element according to the present invention between a charge-air cooler and a throttle valve.

Sensor element 110, for example, plug-in sensor 116, may be configured, namely, in an air system 136 of an internal combustion engine 137 that is shown exemplarily in FIG. 3. As is discernible there, this air system 136 includes, for example, an induction tract 138 including an air filter 140, a charge-air cooler 142, and a throttle valve 144, as well as an exhaust tract 146 that includes an exhaust-gas flap 148. Furthermore, an exhaust gas recirculation 150 may be optionally provided. Sensor element 110 may be configured between charge-air cooler 142 and throttle valve 144, for example, and may be designed as a pressure-based mass airflow meter.

What is claimed is:

1. A sensor element for recording at least one property of a fluid medium, comprising:
    at least one housing, the housing forming at least one wall of at least one flow channel that can be traversed by the flow of the fluid medium, wherein in the wall, at least one pressure tap branches off from the flow channel; and
    at least one pressure sensor for recording a pressure of the fluid medium being configured in the pressure tap;
    wherein, in the wall is at least one outflow contour that at least partially surrounds an orifice of the pressure tap and that is adapted for diverting impurities flowing along the wall away from the orifice of the pressure tap.

2. The sensor element as recited in claim 1, wherein the outflow contour annularly surrounds the orifice of the pressure tap.

3. The sensor element as recited in claim 1, wherein the outflow contour includes an annular groove.

4. The sensor element as recited in claim 3, wherein the annular groove has a circular-cylindrical design.

5. The sensor element as recited in claim 1, wherein the outflow contour has a depth of at least 2 mm.

6. The sensor element as recited in claim 1, wherein a partition wall is provided between the outflow contour and the pressure tap.

7. The sensor element as recited in claim 6, wherein the partition wall is recessed from the wall.

8. The sensor element as recited in claim 1, wherein the pressure tap has a bore that branches off from the flow channel.

9. The sensor element as recited in claim 1, wherein the bore is one of completely or partially configured as a cylindrical bore.

10. The sensor element as recited in claim 1, wherein the pressure tap is a blind bore that branches off from the flow channel, the pressure sensor being configured at one end of the blind bore.

* * * * *